United States Patent
Huntington

[15] 3,686,830
[45] Aug. 29, 1972

[54] MULTIPLE COMPARTMENT CROSS FLOW ABSORBER

[72] Inventor: Richard L. Huntington, Rt. 1, Van Buren, Ohio 45889

[22] Filed: Aug. 3, 1970

[21] Appl. No.: 60,562

Related U.S. Application Data

[63] Continuation-in-part of Ser. No. 814,063, April 7, 1969, Pat. No. 3,576,317.

[52] U.S. Cl. ....................55/233, 55/259, 55/435, 55/512, 261/97, 261/98
[51] Int. Cl. ..............................B01d 47/14
[58] Field of Search..........55/233, 259, 90, 258, 223, 55/260, 512; 261/94–98, 103, 112, 22

[56] References Cited

UNITED STATES PATENTS

| | | | |
|---|---|---|---|
| 571,221 | 11/1896 | Enos | 261/94 |
| 2,054,809 | 9/1936 | Fleisher | 261/98 |
| 2,057,579 | 10/1936 | Kurth | 55/233 |
| 2,608,398 | 8/1952 | Park, Sr. et al. | 261/112 |
| 2,732,190 | 1/1956 | Mart | 261/21 |
| 3,115,534 | 12/1963 | Bottner | 261/112 |
| 3,038,790 | 6/1962 | Beggs et al. | 55/512 |
| 3,346,246 | 10/1967 | Loetel et al. | 261/112 |
| 3,395,900 | 8/1968 | Meek | 261/112 |

Primary Examiner—Bernard Nozick
Attorney—Owen & Owen

[57] ABSTRACT

The invention is a multiple compartment horizontal cross flow packed bed absorber. A hollow shell has corrugated side walls and a corrugated bottom wall. A partition separates the shell into a front compartment and a central compartment. Each of the compartments contains suitable tower packing. A horizontally slotted inlet grill and a vertically slotted outlet grill are provided. A liquid distributor distributes liquid downwardly through the front compartment and the central compartment.

10 Claims, 12 Drawing Figures

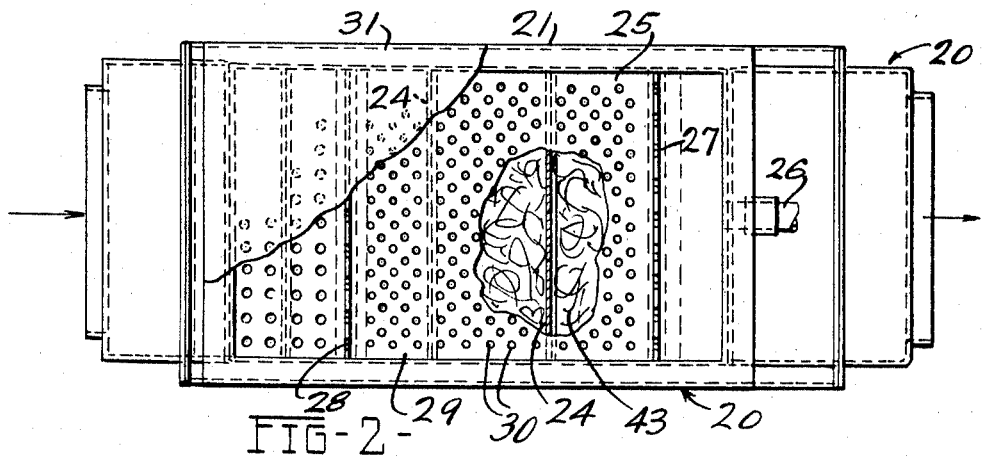
FIG-2-
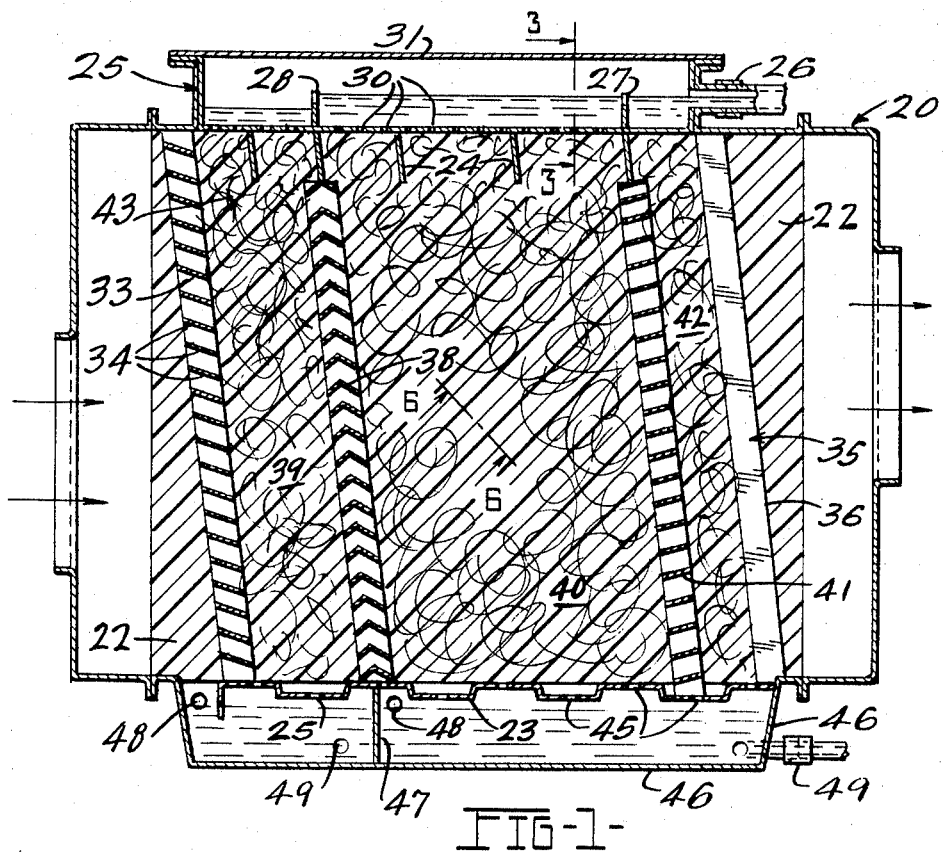
FIG-1-
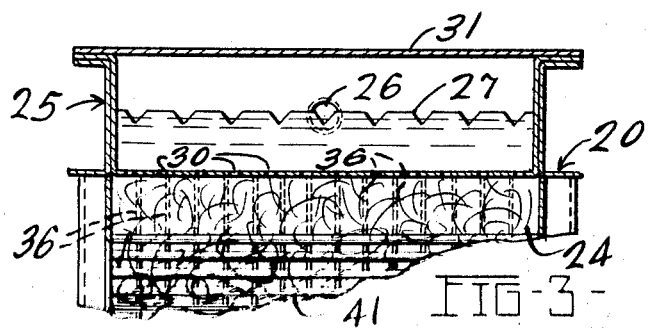
FIG-3-
INVENTOR:
RICHARD L. HUNTINGTON.
BY
Owen & Owen
ATT'YS.

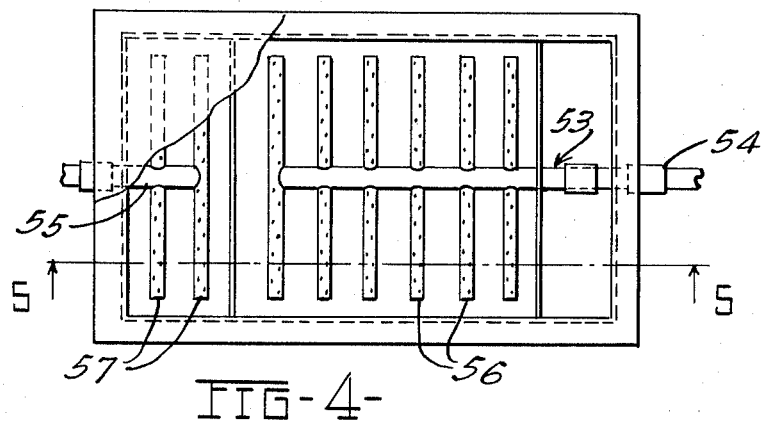
FIG-4-
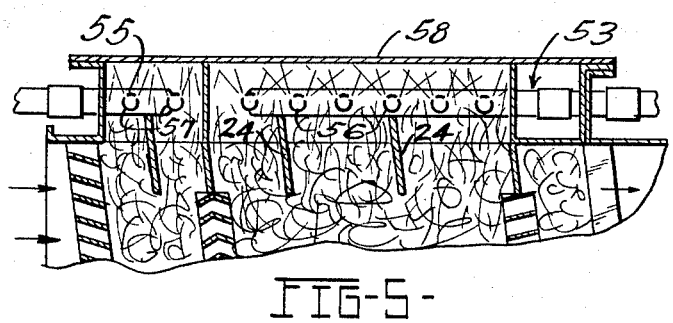
FIG-5-
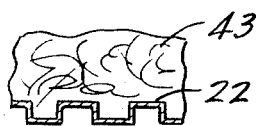
FIG-6-
FIG-7-
FIG-8-
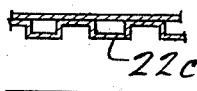
FIG-9-
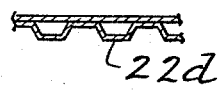
FIG-10-
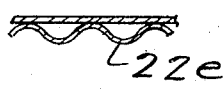
FIG-11-
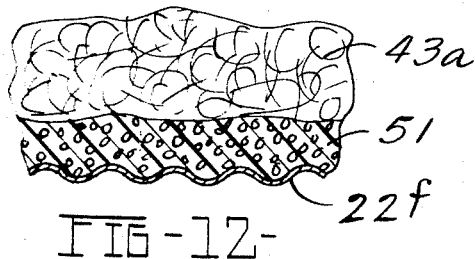
FIG-12-
INVENTOR:
RICHARD L. HUNTINGTON.
BY
Owen & Owen
ATT'YS.

3,686,830

MULTIPLE COMPARTMENT CROSS FLOW ABSORBER

CROSS-REFERENCE TO RELATED APPLICATION

This application is a continuation-in-part of application Ser. No. 814,063, filed Apr. 7, 1969 now U.S. Pat. No. 3,576,317.

BACKGROUND OF THE INVENTION

Cross flow fume scrubbers commonly in use employ a water distributor which discharges clean water upon a packed bed of randomly placed tower fill for gravitation therethrough to a collection basin. The gas to be cleaned moves horizontally through the wetted packed bed under turbulent flow conditions. Particulate removal and gas absorption occur during the travel of the gas. To prevent the buildup of particulate matter, which in turn causes bed cloggage and reduced gas absorption ability, the bed may be slanted in the direction of gas flow. This compensates for water which migrates to the face of the bed and is lost and for water which migrates into the bed interior. Gas by-passes the packed bed by traveling around the edge of the bed. This results from viscosity effects; the discontinuity of the packing and wall; voids at the top of the packed bed caused by the settling of packing; and bed expansion caused by wall deflection.

SUMMARY OF THE INVENTION

This invention relates to a packed wet fume scrubber design for air pollution control and, more particularly, to an improved cross flow packed absorber unit.

An absorber, according to the invention, comprises a hollow shell having corrugated side walls and a corrugated bottom wall. Partition means separate the shell into a front compartment and a central compartment. Both compartments contain suitable tower packing. An inlet grill and an outlet grill are provided and a distributor discharges liquid downwardly through the compartments.

It is, therefore, an important object of this invention to provide a packed bed fume scrubber of improved design, capable of operating at a high gas rate and efficiency level while simultaneously presenting minimum impedance to gas flow for more efficient utilization of water and floor space.

Another object of the present invention is to provide a packed fume scrubber which is rigid, light in weight, and can be built in various shapes without a reduction in absorption efficiency due to variations in the ratio of packed bed cross-sectional area to wall perimeter.

Still another objective of this invention is to provide a method for controlling the migration of scrubbing solution within the packed bed due to hydraulic gradient, and a means for compartmentizing the packed bed into sections for the removal of particulate matter, gas absorption, chemical treatment and mist elimination.

Still an additional object of the present invention is to provide an economical means for monitoring the condition of the packed bed and liquid distribution system.

Still additional objects, benefits, and advantages of this invention will become evident from a study of the following detailed description taken in conjunction with the accompanying drawings.

BRIEF DESCRIPTION OF THE DRAWINGS

FIG. 1 is a sectional view of a cross flow type packed bed absorber showing the internal construction thereof, made in accordance with the present invention;

FIG. 2 is a top view, with parts broken away, of the absorber shown in FIG. 1;

FIG. 43 is a sectional view taken along the line 3—3 of FIG. 1;

FIG. 4 is a plan view with parts broken away of another embodiment of a cross flow type packed bed absorber, according to the present invention;

FIG. 5 is a sectional view taken along the line 5—5 of FIG. 4;

FIG. 6 is a sectional view taken along the line 6—6 of FIG. 1;

FIGS. 7–11 are views similar to FIG. 6, showing other types of wall constructions; and FIG. 12 is a view similar to FIG. 6 and showing another embodiment which includes a layer of foamed plastic material adjacent the side wall.

DESCRIPTION OF THE PREFERRED EMBODIMENTS

Referring now to FIG. 1, a multiple compartment horizontal cross flow packed bed absorber, according to the present invention, is generally indicated by the reference number 20. The absorber 20 includes a hollow shell 21 having corrugated side walls 22 and a corrugated bottom wall 23. A plurality of internal baffles 24 extend between the side walls 22. In the present embodiment, a sieve plate liquid distributor 25 is positioned above and supported by the baffles 24. The sieve plate liquid distributor 25 has a liquid inlet 26, weirs 27 and 28, a bottom wall 29 having a plurality of openings 30, and a cover plate 31. If desired, the plate may be constructed of a transparent material.

As water or other liquid flows inwardly through the inlet 26, a controlled liquid head and liquid rate are maintained by the weirs 27 and 28. The absorber 20 includes a slotted horizontal gas inlet grill 33. The inlet grill 33 is tilted in the direction of gas flow and includes a plurality of vertically spaced and horizontally disposed slats 34. The slats 34 slope toward the face of the packed bed to return irrigation liquid to the face of the bed.

A slanted outlet grill 35 consisting of a plurality of horizontally spaced members 36 (FIG. 3) is positioned parallel to the inlet grill 33. The members or vanes 36 extend upwardly sloping toward the packed bed. The members 36 serve as supports for the mist eliminator packed bed.

Referring to FIG. 1, in the present embodiment, a partition 38, comprising a series of vertically spaced members having "chevron" cross sections, divides the shell 20 into a front compartment 39 and a central compartment 40. The chevron shaping urges liquid which flows downwardly back into the respective compartments 39 and 40. A second partition 41 consisting of a series of vertically spaced members sloping toward the central compartment 40 divides the shell 20 between the central compartment 40 and a rear or mist elimination compartment 42.

Each of the compartments 39, 40 and 42 is filled with a packing material 43. As shown in FIG. 6, the side walls 22 are corrugated. The corrugations may be of many shapes. Various types of side walls 22 having various corrugated shapes are shown in FIGS. 6–11. The corrugations of the side walls 22 are tilted in the direction of gas flow (see FIG. 1) and are at an angle to both the direction of gas flow and also the liquid flow from the distributor 25. The bottom wall 23 is also corrugated and is positioned at an angle to the direction of gas flow In the preferred embodiment, the corrugations are perpendicular to the direction of gas flow.

The bottom wall 23 has a plurality of openings 45. A sump chamber 46 is positioned below the bottom wall 23 and receives liquid which flows downwardly through the packed beds and through the openings 45. The present sump chamber 46 is divided by a partition 47. A pair of overflow openings 48 and pump suction lines 49 are located in the side walls of the sump chamber 46.

In operation, liquid enters the tower or absorber 20 through the liquid inlet 26 and is distributed across the packing in the front compartment 39 and the central compartment 40 by the distributor 25. The liquid passes over the weirs 27 and 28 and downwardly through the openings 30 upon the packed beds. It has been found that the side wall corrugations tend to eliminate voids along the side walls which result in liquid and gas "short circuiting." Similarly, the baffles 24 reduce by-passing when the packing material 43 has voids formed at its upper portion, for example, by settlement. As the liquid flows downwardly through the packing material 43, the configurations of the corrugated wall return it to the packing.

The gas to be cleaned enters the bed through the face of the inlet grills 33 and passes horizontally through the packed beds within the front compartment 39 and the central compartment 40 (see arrows in FIG. 1). It then passes through the mist eliminator packed bed located in the rear compartment 42, the latter bed being operated dry. Gas flow at the junction of the packed bed and the walls is effectively minimized by the wall corrugations which force the gas to flow through the packed bed by increasing flow resistance along the wall.

Normally, the packed bed within the front compartment 39 is operated at a higher liquid rate than the bed of the central compartment 40 when heavy dust loadings are involved. The migration of liquid from the front compartment 39 to the central compartment 40 is minimized by the chevron shaped partition 38, which deflects the liquid in both compartments making possible independent operation. Under conditions of extremely heavy dust loading, the liquid flow from the front compartment 39 may be by-passed to a discharge sewer to prevent the buildup of solids in the return water. The compartmented absorber, according to the present invention, is extremely useful in many air pollution problems. For example, it has been found that the front compartment 39 may be operated as a straight water scrubbing compartment to remove large organic particles while at the same time the central compartment 40 is chemically treated with potassium permanganate, to control odors. Such a construction and usage reduces the overall cost of chemicals and still results in efficient pollution control.

High liquid rates in the front compartment 39 can be achieved by means of a water recirculation pump (not shown) which uses water from the sump chamber 46 and from other make up sources. The method of operation is, of course, determined by economics and the nature of the air pollution control problem.

When using the sieve plate liquid distributor 25 shown in FIGS. 1 and 2, the liquid rate to the individual packed beds is determined by the size, location and number of openings 30 together with the height of the liquid above the openings 30. The height is, of course, regulated by the overflow weirs 27 and 28 and the liquid flow rate to the distributor. This type of distributor is used for parallel feed, when batch chemicals are to be added, and when large liquid flows are involved.

In another embodiment of the present invention (see FIG. 12), a layer of foam plastic material 51 is positioned adjacent the corrugated side wall 22f. In this embodiment, the foam layer is interposed between the side wall 22f and the packing material 43a. It has been found that the foam layer 51 is effective in reducing wall voidage and packing dislocation both of which contribute to gas and liquid channeling along the wall and in the packing adjacent to the wall.

Another embodiment of the present invention is shown in FIGS. 4 and 5. This embodiment includes a splash plate distributor 53. The distributor 53 comprises header pipes 54 and 55 and a plurality of drilled discharge pipes or distributor pipes 56 and 57. A deflection plate or splash plate 58 is mounted over the discharge pipes 56 and 57. In operation, the liquid streams from the drilled holes in the discharge pipes 56 and 57 are directed upwardly at an angle to and impinge upon the underside of the splash plate 58. The liquid streams are reflected and broken up and fall downwardly by gravity to the top of the packed bed. Preferably the splash plate 58 consists of a translucent plastic sheet which enables the visual inspection of the top of the packed bed and of the drilled pipe distributor 53. Normally, the header pipe 54 is independent from the header pipe 55 and in the present embodiment the liquid rates to the front compartment 39 and the central compartment 40 may be independently controlled by varying the rates of liquid flow within the respective headers 54 and 55.

While this invention has been described with particular reference to the embodiments shown in the drawings, many changes may be made in the detailed construction, such as the number of packed bed chambers. It shall be understood that such changes shall be within the spirit and scope of the present invention as defined by the following claims.

I claim:

1. A multiple compartment horizontal cross flow packed bed absorber comprising, in combination, a hollow shell having an inlet and an outlet for gas and corrugated side walls and a corrugated bottom wall, wherein said side wall corrugations and said bottom wall corrugations are inclined at an angle to both the direction of gas flow and liquid flow, partition means for separating said shell into a front compartment and a contiguous central compartment, said front compartment communicating with said central compartment through said partition means, said front compartment and said central compartment each containing suitable tower packing, inlet and outlet means for gas in the front and rear respectively, said tower packing filling said compartments and being supported by said side walls, said inlet means and said outlet means, and means for distributing liquid downwardly through said front compartment and said central compartment, said shell including a rear compartment and the bottom wall being provided with a liquid outlet.

2. A multiple compartment horizontal cross flow packed bed absorbed, according to claim 1, wherein said inlet and outlet means includes an inlet grill and an outlet grill, said grills tilted in the direction of gas flow.

3. A multiple compartment horizontal cross flow packed bed absorber, according to claim 2, wherein said inlet grill comprises a plurality of vertically spaced horizontal slats, said slats sloping toward the face of the packed bed.

4. A multiple compartment horizontal cross flow packed bed absorber, according to claim 1, wherein said partition means comprises a slotted horizontal wall including a plurality of vertically spaced members having a chevron shaped cross section.

5. A multiple compartment horizontal cross flow packed bed absorber, according to claim 1, including a second partition means for separating said shell into a central compartment and a rear compartment.

6. A multiple compartment horizontal cross flow packed bed absorber, according to claim 1, including a layer of foamed plastic material positioned adjacent said corrugated side walls.

7. A multiple compartment horizontal cross flow packed bed absorber, according to claim 1, wherein said distributing means includes means for supplying liquid to such front compartment at a higher rate than to said central compartment.

8. A multiple compartment horizontal cross flow packed bed absorber, according to claim 1, wherein said distributing means comprises a sieve plate parallel flow distributor.

9. A multiple compartment horizontal cross flow packed bed absorber, according to claim 8, including a plurality of internal baffles positioned adjacent the upper end of said hollow shell, said baffles being perpendicular to the direction of gas flow.

10. A multiple compartment horizontal cross flow packed bed absorber, according to claim 1, wherein said distributing means comprises at least one header pipe having extending therefrom a plurality of drilled discharge pipes and a horizontal deflection plate mounted above said pipes.

* * * * *